(12) United States Patent
Mochizuki et al.

(10) Patent No.: US 10,137,334 B2
(45) Date of Patent: *Nov. 27, 2018

(54) GOLF BALL MANUFACTURING METHOD

(71) Applicant: Bridgestone Sports Co., Ltd., Minato-ku, Tokyo (JP)

(72) Inventors: Katsunobu Mochizuki, Saitamaken (JP); Hiroyuki Nagasawa, Saitamaken (JP); Kanae Tajima, Saitamaken (JP); Masahiro Yamabe, Saitamaken (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 15/371,666

(22) Filed: Dec. 7, 2016

(65) Prior Publication Data

US 2017/0080297 A1 Mar. 23, 2017

Related U.S. Application Data

(63) Continuation of application No. 14/757,462, filed on Dec. 23, 2015, now Pat. No. 9,545,543, which is a continuation-in-part of application No. 14/729,207, filed on Jun. 3, 2015, now Pat. No. 9,682,283.

(30) Foreign Application Priority Data

Jun. 27, 2014 (JP) ................................ 2014-132124
Jun. 27, 2014 (JP) ................................ 2014-132137

(51) Int. Cl.
| | |
|---|---|
| A63B 45/00 | (2006.01) |
| C08J 7/06 | (2006.01) |
| B29C 71/00 | (2006.01) |
| B08B 3/02 | (2006.01) |
| B08B 5/02 | (2006.01) |
| A63B 37/00 | (2006.01) |
| B29C 71/02 | (2006.01) |
| B29K 75/00 | (2006.01) |
| B29L 9/00 | (2006.01) |
| B29L 31/54 | (2006.01) |

(52) U.S. Cl.
CPC ............ *A63B 45/00* (2013.01); *A63B 37/008* (2013.01); *A63B 37/0022* (2013.01); *A63B 37/0027* (2013.01); *A63B 37/0031* (2013.01); *A63B 37/0033* (2013.01); *A63B 37/0074* (2013.01); *A63B 37/0075* (2013.01); *A63B 37/0076* (2013.01); *A63B 37/0083* (2013.01); *A63B 37/0095* (2013.01); *A63B 37/0096* (2013.01); *B08B 3/02* (2013.01); *B08B 5/02* (2013.01); *B29C 71/00* (2013.01); *B29C 71/0009* (2013.01); *B29C 71/02* (2013.01); *C08J 7/065* (2013.01); *B29C 2071/0018* (2013.01); *B29C 2071/0027* (2013.01); *B29C 2071/0045* (2013.01); *B29K 2075/00* (2013.01); *B29L 2009/00* (2013.01); *B29L 2031/546* (2013.01)

(58) Field of Classification Search
None
See application file for complete search history.

(56) References Cited

U.S. PATENT DOCUMENTS

| | | |
|---|---|---|
| 3,395,109 A | 7/1968 | Molitor et al. |
| 4,248,432 A | 2/1981 | Hewitt et al. |
| 4,347,338 A | 8/1982 | Torii et al. |
| 4,442,282 A | 4/1984 | Kolycheck |
| 5,006,297 A | 4/1991 | Brown et al. |
| 5,334,673 A | 8/1994 | Wu |
| 5,733,428 A | 3/1998 | Calabria et al. |
| 5,888,437 A | 3/1999 | Calabria et al. |
| 5,897,884 A | 4/1999 | Calabria et al. |
| 5,929,189 A | 7/1999 | Ichikawa et al. |
| 5,947,843 A | 9/1999 | Calabria et al. |
| 6,117,024 A | 9/2000 | Dewanjee |
| 6,190,268 B1 | 2/2001 | Dewanjee |
| 6,458,307 B2 | 10/2002 | Inoue et al. |
| 6,582,325 B1 | 6/2003 | Ichikawa et al. |
| 6,680,122 B2 | 1/2004 | Shigeo et al. |
| 6,729,975 B2 | 5/2004 | Inoue et al. |
| 6,747,100 B2 | 6/2004 | Ichikawa et al. |
| 6,806,323 B2 | 10/2004 | Ichikawa et al. |
| 6,939,251 B2 | 9/2005 | Ichikawa et al. |
| 7,867,111 B2 | 1/2011 | Matroni et al. |
| 8,182,367 B2 | 5/2012 | Nagasawa et al. |
| 8,367,781 B2 | 2/2013 | Nagasawa et al. |
| 9,545,543 B2 * | 1/2017 | Mochizuki ............ A63B 45/00 |
| 2013/0323512 A1 | 12/2013 | Ichikawa et al. |

FOREIGN PATENT DOCUMENTS

| | | |
|---|---|---|
| JP | 582063 B2 | 1/1983 |
| JP | 9271538 A | 10/1997 |
| JP | 11178949 A | 7/1999 |
| JP | 2002336378 A | 11/2002 |
| JP | 2002336380 A | 11/2002 |
| JP | 3494441 B2 | 2/2004 |
| JP | 2004099523 A | 4/2004 |
| JP | 2004099748 A | 4/2004 |
| JP | 4051374 B2 | 2/2008 |
| JP | 4114198 A | 4/2008 |
| JP | 4247735 A | 1/2009 |
| JP | 5212599 B2 | 6/2013 |

* cited by examiner

*Primary Examiner* — David J Buttner
(74) *Attorney, Agent, or Firm* — Sughrue Mion, PLLC

(57) ABSTRACT

The invention provides a method of manufacturing a golf ball having a core and a cover of one or more layer over the core, wherein an outermost layer of the cover is molded of a thermoplastic material selected from the group consisting of polyurethane, polyurea and mixtures thereof. The method includes at least the following steps (1) and (2):
  (1) treating a surface of the cover with an isocyanate compound; and
  (2) washing off and physically removing excess isocyanate compound by blasting the cover surface with a specific substance at high pressure.

12 Claims, 2 Drawing Sheets

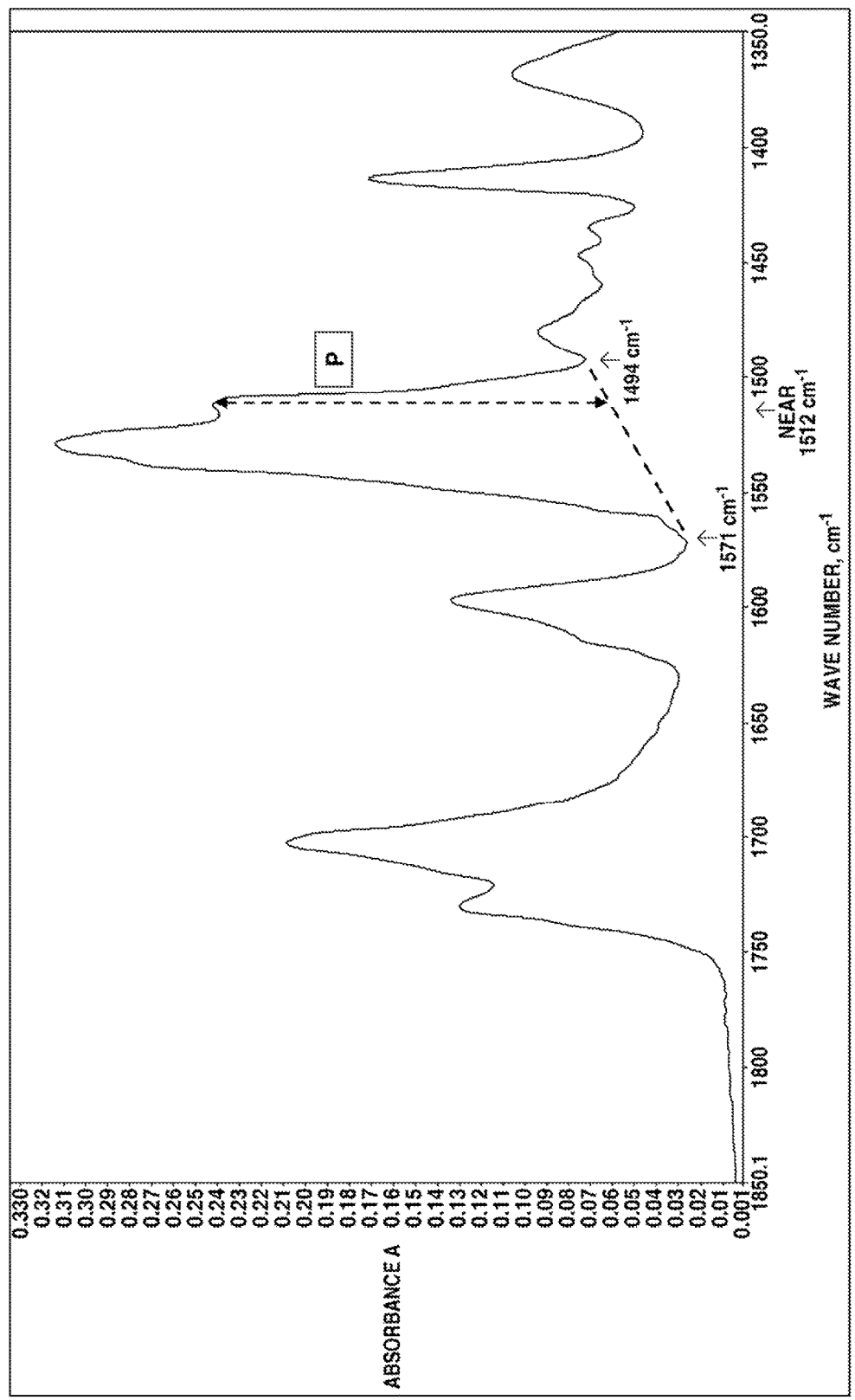

GOLF BALL MANUFACTURING METHOD

CROSS-REFERENCE TO RELATED APPLICATION

This is a continuation of U.S. patent application Ser. No. 14/757,462 filed Dec. 23, 2015 now U.S. Pat. No. 9,545,543, which is a continuation-in-part of copending application Ser. No. 14/729,207 filed on Jun. 3, 2015 now U.S. Pat. No. 9,682,283, the entire contents of each of which are hereby incorporated by reference.

BACKGROUND OF THE INVENTION

The present invention relates to a method of manufacturing a golf ball having a cover made of a thermoplastic material, which ball, owing to the application during ball production of a specific treatment to the surface of the cover molded from the thermoplastic material, has an excellent scuff resistance, excellent spin properties and a good ball appearance.

The use of polyurethane materials as golf ball cover-forming materials has attracted attention in recent years. Polyurethane materials, in terms of the molding method used to obtain moldings therefrom, are broadly divided into thermoset polyurethane materials and thermoplastic polyurethane materials.

However, moldings of thermoset polyurethane materials have no plasticity when heated, and so the feedstock and molded articles made therewith cannot be recycled. Moreover, in the production of such moldings, the thermosetting step and the cooling step take a long time, in addition to which the feedstock has a high reactivity when heated and is thus unstable, making the molding time very difficult to control. Hence, the productivity of thermoset polyurethane materials when used to make special moldings such as golf ball covers (moldings which encase a core material) is regarded as poor.

By contrast, moldings of thermoplastic polyurethane materials are not obtained by the direct reaction of a feedstock; instead, a linear polyurethane material synthesized by using starting materials and a production process which differ somewhat from the foregoing thermoset polyurethane materials are used in molding. Such polyurethane materials are thermoplastic; thermoplasticized polyurethane materials have the quality of hardening on cooling. Therefore, it is possible to mold such polyurethane materials using an injection molding machine. The injection molding of thermoplastic polyurethane materials is ideal as a method for molding golf ball covers, both because the molding time is very short compared with the molding time for thermoset polyurethane materials and because this method is suitable for precision molding. Also, thermoplastic polyurethane materials are recyclable and thus friendly to the global environment.

JP-A 2002-336378 describes a golf ball obtained using a cover material composed of a thermoplastic polyurethane material and an isocyanate mixture. The cover material is a thermoplastic polyurethane material that is recyclable and moreover has a high resilience and an excellent scuff resistance. This cover material has both the good productivity of a thermoplastic polyurethane and also exhibits physical properties comparable with those of a thermoset polyurethane. At the same time, owing to the plasticizing effect of the isocyanate compound, such an approach enhances the flowability of the thermoplastic polyurethane material and is thus able to improve productivity. Although this art is outstanding in the above respects, because burn contaminants arise due to direct charging of the isocyanate mixture into the molding machine and there is some variability in the compounding ratio owing to the use of dry blending, the uniformity is poor, giving rise to molding instability. At the same time, the compositional ratio within the isocyanate mixture between the isocyanate compound and the thermoplastic resin that is substantially non-reactive with isocyanate has already been set, and so one has less freedom of choice in the amounts and types of isocyanate compound and thermoplastic resin to be added.

JP 5212599 describes a golf ball which has a high rebound and an excellent spin performance and scuff resistance, and also has a high cover material flowability and a high productivity. However, the thermoplastic polyurethane material used in this art is a special resin mixture, and there are certain challenges associated with the production, supply and cost of such resin mixtures. Moreover, because this art entails charging an injection molding machine and ancillary equipment with a material in which isocyanate groups remain in an unreacted state, undesirable effects such as seizing and solidification due to deposition of the isocyanate ingredient arise and can cause an increase in the percent defective.

JP 3494441 discloses art which, in a golf ball having a cover made of thermoplastic resin, subjects the surface layer of the cover to modification treatment, thereby giving a cover having excellent properties. Although this is an excellent approach that enables the properties to be modified after the cover has been molded from a thermoplastic material of excellent moldability, there remains room for improvement in the degree to which the scuff resistance is enhanced and in the golf ball properties following modification. Particularly in cases where 4,4'-diphenylmethane diisocyanate (MDI) has been selected as the polyisocyanate compound, the MDI must be held at the solidifying point (about 39° C.) or higher in order to place it in a molten liquid state suitable for treatment. In the case of MDI, production of the dimer also requires care; that is, dimer production generally speeds up at a higher temperature, and so close temperature control is required to ensure stable productivity, which can be troublesome. When an ionomer material is used in part of the golf ball, there is also a possibility that treatment at a high temperature will give rise to deformation or a change in properties.

JP 4051374 describes a method of manufacturing golf balls produced with a thermoplastic polyurethane, polyurea or mixed material thereof having a high melt index. More specifically, this method includes the step of obtaining a base thermoplastic polyurethane, polyurea or mixed material thereof; the step of raising the melt index of this base resin material; the step of molding the thermoplastic polyurethane material having an increased melt index in a mold; and the subsequent step of treating the molded material with a secondary curing agent such as an isocyanate solution. This art is outstanding in that, by crosslinking the cover material using an isocyanate ingredient, resistance to damage can be imparted while maintaining the other desirable characteristics of the cover, such as a soft feel. However, in cases where the secondary curing agent includes an organic solvent capable of causing the cover material to swell, depending on the treatment conditions, this may cause deformations on the order of several microns in the dimple shape, which may adversely impact the flight performance, and the appearance of the golf ball may worsen due to solvent infiltration to the cover material interface that arises during molding.

SUMMARY OF THE INVENTION

It is therefore an object of the invention to provide a golf ball having a scuff resistance, spin properties, ball appearance and the like that are even better than those of prior-art golf balls.

The inventors have conducted extensive investigations, as a result of which, in the earlier filed U.S. patent application Ser. No. 14/729,207, they disclosed a method of manufacturing a golf ball having a core and a cover of one or more layer molded over the core, which method includes the steps of: molding an outermost layer of the cover using a thermoplastic material selected from the group consisting of polyurethane, polyurea and mixtures thereof; and subsequently treating a surface of the cover with a polyisocyanate compound that is free of organic solvent. However, in this already disclosed invention, there is still much room for improvement with regard to the support pin marks that remain due to swelling after surface treatment of the injection-molded cover.

The inventors have subsequently made further and repeated improvements in this disclosed golf ball manufacturing method, as a result of which they have found that by blasting a substance such as water, alcohol, dry ice, air or various types of abrasives at high pressure against the outermost cover layer that has been treated with such an isocyanate compound and thereby physically washing off and removing excess isocyanate compound present on the outermost cover layer, the resulting manufactured ball has an excellent scuff resistance, maintains a low spin rate on driver (W#1) shots, thus having a good flight performance, and has an unblemished appearance with no remaining pin marks from injection molding in a mold.

Accordingly, the invention provides the following golf ball.

[1] A method of manufacturing a golf ball having a core and a cover of one or more layer over the core, wherein an outermost layer of the cover is molded of a thermoplastic material selected from the group consisting of polyurethane, polyurea and mixtures thereof, the method including at least the following steps (1) and (2):

(1) treating a surface of the cover with an isocyanate compound; and (2) washing off and physically removing excess isocyanate compound by blasting the cover surface with a specific substance at high pressure.

[2] The golf ball manufacturing method of [1] wherein, in step (2), the specific substance that is blasted at high pressure is at least one selected from the group consisting of water, alcohol, dry ice, air, sand, vitrified abrasives, plastic abrasives, alumina abrasives, organic abrasives, metal abrasives, and mixtures thereof.

[3] The golf ball manufacturing method of [1] wherein, in step (2), blasting with the specific substance is carried out at a discharge pressure of at least 3 MPa.

[4] The golf ball manufacturing method of [1] wherein, in step (2), blasting with the specific substance is carried out at a temperature of at least 5° C.

[5] The golf ball manufacturing method of [1] wherein, in step (2), washing is carried out for a washing time of at least 10 seconds.

[6] The golf ball manufacturing method of [1] wherein, when an infrared absorption spectrum measured by FT-IR/ATR spectroscopy at an outside portion of the outermost cover layer of the golf ball manufactured by steps (1) and (2) is plotted as absorbance versus wave number, letting the absorbance peak heights near the wave numbers 1512 $cm^{-1}$, 2280 $cm^{-1}$ and 2840 $cm^{-1}$ be respectively $P_1$, $Q_1$ and $R_1$, the value $Q_1/R_1$ is larger than $P_1$.

[7] The golf ball manufacturing method of [6], wherein the value $Q_1/R_1$ is at least 0.3.

[8] The golf ball manufacturing method of [6], wherein the value $Q_1/R_1$ is at least 0.4.

[9] The golf ball manufacturing method of [1], wherein the isocyanate compound is one or a mixture of two or more selected from the group consisting of tolylene-2,6-diisocyanate, tolyene-2,4-diisocyanate, 4,4'-diphenylmethanediisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives thereof, and prepolymers formed of said isocyanate compounds.

[10] The golf ball manufacturing method of [1] wherein, in step (10), the isocyanate compound is polymethylene polyphenyl polyisocyanate (polymeric MDI).

BRIEF DESCRIPTION OF THE DIAGRAMS

FIG. 2 is an enlarged view of part of the infrared absorption spectrum shown in FIG. 1.

DETAILED DESCRIPTION OF THE INVENTION

Figure 1:
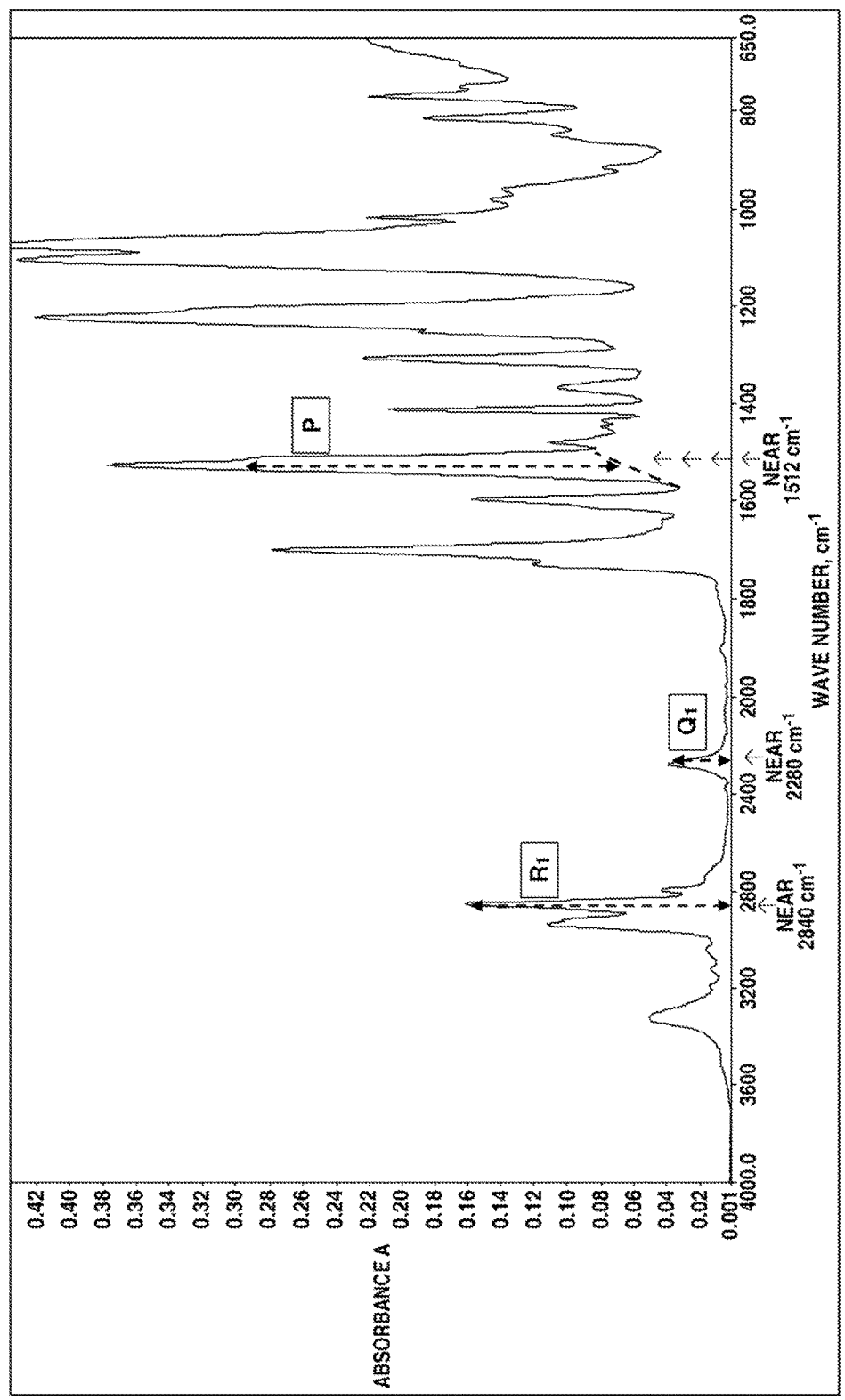
FIG. 1 shows an example of an infrared absorption spectrum (absorbance versus wave number) measured by FT-IR/ATR spectroscopy at a specific portion of the outermost layer of a golf ball cover.

The invention is described more fully below.

The inventive manufacturing method is a method of manufacturing golf balls by molding a cover of one or more layer over a core, in which method an outermost layer of the cover is molded of a thermoplastic material selected from the group consisting of polyurethane, polyurea and mixtures thereof.

In this invention, of the various cover layers, the outermost layer is a layer molded of a thermoplastic material selected from the group consisting of polyurethane, polyurea and mixtures thereof. The proportion of the overall cover resin composition accounted for by polyurethane, polyurea or a mixture thereof, although not particularly limited, may be set to 50 wt % or more, and preferably 80 wt % or more. The polyurethane and polyurea are described below.

Polyurethane

The thermoplastic polyurethane material has a structure which includes soft segments composed of a polymeric polyol that is a long-chain polyol (polymeric glycol), and hard segments composed of a chain extender and a polyisocyanate. Here, the polymeric polyol serving as a starting material is not subject to any particular limitation, and may be any that is used in the prior art relating to thermoplastic polyurethane materials. Exemplary polymeric polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Illustrative examples of polyester polyols include adipate-based polyols such as polyethylene adipate glycol, polypropylene adipate glycol, polybutadiene adipate glycol and polyhexamethylene adipate glycol; and lactone-based polyols such as polycaprolactone polyol. Illustrative examples of polyether polyols include poly(ethylene glycol), poly(propylene glycol), poly(tetramethylene glycol) and poly(methyltetramethylene glycol). These may be used singly or as a combination of two or more thereof.

The number-average molecular weight of these long-chain polyols is preferably in the range of 500 to 5,000. By using a long-chain polyol having such a number-average molecular weight, golf balls made with a thermoplastic polyurethane composition having excellent properties such as the above-mentioned resilience and productivity can be reliably obtained. The number-average molecular weight of the long-chain polyol is more preferably in the range of 1,500 to 4,000, and even more preferably in the range of 1,700 to 3,500.

Here, and below, "number-average molecular weight" refers to the number-average molecular weight calculated based on the hydroxyl number measured in accordance with JIS K-1557.

The chain extender is not particularly limited, although preferred use may be made of those employed in the prior art relating to thermoplastic polyurethanes. A low-molecular-weight compound which has a molecular weight of 2,000 or less and bears on the molecule two or more active hydrogen atoms capable of reacting with isocyanate groups may be used in this invention, with the use of an aliphatic diol having from 2 to 12 carbons being preferred. Specific examples of the chain extender include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

The polyisocyanate compound is not subject to any particular limitation, although preferred use may be made of those employed in the prior art relating to thermoplastic polyurethanes. Specific examples include one, two or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. Depending on the type of isocyanate used, the cross-linking reaction during injection molding may be difficult to control.

Although not an essential ingredient, a thermoplastic resin or elastomer other than a thermoplastic polyurethane may also be included. More specifically, use may be made of one, two or more selected from among polyester elastomers, polyamide elastomers, ionomer resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of polyester elastomers, polyamide elastomers and polyacetals is especially preferred because these increase the resilience and scuff resistance due to reaction with the isocyanate groups while yet maintaining a good productivity. When these ingredients are included, the content thereof is suitably selected so as to, for example, adjust the cover material hardness, improve the resilience, improve the flow properties or improve adhesion. The content of these ingredients, although not particularly limited, may be set to preferably at least 5 parts by weight per 100 parts by weight of the thermoplastic polyurethane component. Although there is no particular upper limit, the content per 100 parts by weight of the thermoplastic polyurethane component may be set to preferably not more than 100 parts by weight, more preferably not more than 75 parts by weight, and even more preferably not more than 50 parts by weight.

The ratio of active hydrogen atoms to isocyanate groups in the above polyurethane-forming reaction may be adjusted within a desirable range so as to make it possible to obtain golf balls which are made with a thermoplastic polyurethane composition and have various improved properties, such as rebound, spin performance, scuff resistance and productivity. Specifically, in preparing a thermoplastic polyurethane by reacting the above long-chain polyol, polyisocyanate compound and chain extender, it is desirable to use the respective components in proportions such that the amount of isocyanate groups included in the polyisocyanate compound per mole of active hydrogen atoms on the long-chain polyol and the chain extender is from 0.95 to 1.05 moles.

No particular limitation is imposed on the method of preparing the thermoplastic polyurethane. Preparation may be carried out by either a prepolymer process or a one-shot process using a known urethane-forming reaction.

A commercial product may be used as the above thermoplastic polyurethane material. Illustrative examples include the products available under the trade name "Pandex" from DIC Bayer Polymer, Ltd., and the products available under the trade name "Resamine" from Dainichiseika Color & Chemicals Mfg. Co., Ltd.

Polyurea

The polyurea is a resin composition composed primarily of urea linkages formed by reacting (i) an isocyanate with (ii) an amine-terminated compound. This resin composition is described in detail below.

(i) Isocyanate

The isocyanate is preferably one that is used in the prior art relating to thermoplastic polyurethanes, but is not subject to any particular limitation. Use may be made of isocyanates similar to those described above in connection with the polyurethane material.

(ii) Amine-Terminated Compound

An amine-terminated compound is a compound having an amino group at the end of the molecular chain. In the present invention, the long-chain polyamines and/or amine curing agents shown below may be used.

A long-chain polyamine is an amine compound which has on the molecule at least two amino groups capable of reacting with isocyanate groups, and which has a number-average molecular weight of from 1,000 to 5,000. In this invention, the number-average molecular weight is more preferably from 1,500 to 4,000, and even more preferably from 1,900 to 3,000. Within this average molecular weight range, an even better resilience and productivity are obtained. Examples of such long-chain polyamines include, but are not limited to, amine-terminated hydrocarbons, amine-terminated polyethers, amine-terminated polyesters, amine-terminated polycarbonates, amine-terminated polycaprolactones, and mixtures thereof. These long-chain polyamines may be used singly, or as combinations of two or more thereof.

An amine curing agent is an amine compound which has on the molecule at least two amino groups capable of reacting with isocyanate groups, and which has a number-average molecular weight of less than 1,000. In this invention, the number-average molecular weight is more preferably less than 800, and even more preferably less than 600. Such amine curing agents include, but are not limited to, ethylenediamine, hexamethylenediamine, 1-methyl-2,6-cyclohexyldiamine, tetrahydroxypropylene ethylenediamine, 2,2,4- and 2,4,4-trimethyl-1,6-hexanediamine, 4,4'-bis(sec-butylamino)dicyclohexylmethane, 1,4-bis(sec-butylamino)cyclohexane, 1,2-bis(sec-butylamino)cyclohexane, derivatives of 4,4'-bis(sec-butylamino)dicyclohexylmethane, 4,4'-dicyclohexylmethanediamine, 1,4-cyclohexane bis(methylamine), 1,3-cyclohexane bis(methylamine), diethylene glycol di(aminopropyl)ether, 2-methylpentamethylenediamine, diaminocyclohexane, diethylenetriamine, triethylenetetramine, tetraethylenepentamine, propylenediamine, 1,3-diaminopropane, dimethylaminopropylamine, diethylaminopropylamine, dipropylenetriamine, imido-bis(propylamine), monoethanolamine, diethanolamine, triethanolamine, monoisopropanolamine, diisopropanolamine, isophoronediamine, 4,4'-methylenebis(2-chloroaniline), 3,5-dimethylthio-2,4-toluenediamine, 3,5-dimethylthio-2,6-toluenediamine, 3,5-diethylthio-2,4-toluenediamine, 3,5-diethylthio-2,6-toluenediamine, 4,4'-bis(sec-butylamino)diphenylmethane and derivatives thereof, 1,4-bis(sec-butylamino)benzene, 1,2-bis(sec-butylamino)benzene, N,N'-dialkylamino-diphenylmethane, N,N,N',N'-tetrakis(2-hydroxypropyl)ethylenediamine, trimethylene glycol di-p-aminobenzoate, polytetramethylene oxide di-p-aminobenzoate, 4,4'-methylenebis(3-chloro-2,6-diethyleneaniline), 4,4'-methylenebis(2,6-diethylaniline), m-phenylenediamine, p-phenylenediamine and mixtures thereof. These amine curing agents may be used singly or as combinations of two or more thereof.

(iii) Polyol

Although not an essential component, in addition to the above-described components (i) and (ii), a polyol may also be included in the polyurea. In this invention, the polyol is not particularly limited, but is preferably one that has hitherto been used in the art relating to thermoplastic polyurethanes. Specific examples include the long-chain polyols and/or polyol curing agents described below.

The long-chain polyol may be any that has hitherto been used in the art relating to thermoplastic polyurethanes. Examples include, but are not limited to, polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or as combinations of two or more thereof.

The long-chain polyol has a number-average molecular weight of preferably from 500 to 5,000, and more preferably from 1,700 to 3,500. In this average molecular weight range, an even better resilience and productivity are obtained.

The polyol curing agent is preferably one that has hitherto been used in the art relating to thermoplastic polyurethanes, but is not subject to any particular limitation. In this invention, use may be made of a low-molecular-weight compound having on the molecule at least two active hydrogen atoms capable of reacting with isocyanate groups, and having a molecular weight of less than 1,000. Of these, the use of aliphatic diols having from 2 to 12 carbons is preferred. Specific examples include 1,4-butylene glycol, 1,2-ethylene glycol, 1,3-butanediol, 1,6-hexanediol and 2,2-dimethyl-1,3-propanediol. The use of 1,4-butylene glycol is especially preferred. The polyol curing agent has a number-average molecular weight of preferably less than 800, and more preferably less than 600.

Where necessary, various additives may also be included in the polyurethane and polyurea. For example, pigments, inorganic fillers, dispersants, antioxidants, light stabilizers, ultraviolet absorbers and mold release agents may be suitably included.

A known method may be used to produce the polyurea. A prepolymer process, a one-shot process or some other known method may be suitably selected for this purpose.

The method of molding the cover using the polyurethane and the polyurea may involve, for example, feeding these materials to an injection-molding machine and injecting them over the core. The molding temperature in such a case varies depending on the formulation and other factors, but is generally in the range of 150 to 270° C.

Step (1): Treatment with Isocyanate Compound

The inventive manufacturing method includes a step in which the surface of the outermost cover layer molded as described above is treated with an isocyanate compound. This treatment method is described below.

The treatment method uses an isocyanate compound, with the use of an isocyanate compound containing no organic solvent being preferred. Here, the isocyanate compound, although not particularly limited, is typically selected from the following group.

<Group of Isocyanate Compounds for Selection>

The group consisting of tolylene-2,6-diisocyanate, tolylene-2,4-diisocyanate, 4,4'-diphenylmethane diisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives of these, and prepolymers formed of such isocyanate compounds.

An aromatic isocyanate compound is preferably used as the isocyanate compound, with the use of 4,4'-diphenylmethane diisocyanate (monomeric, or "pure," MDI) or polymethylene polyphenyl polyisocyanate (polymeric MDI) being especially preferred. When an aromatic isocyanate compound is used in the invention, because it has a high reactivity with the reactive groups on the thermoplastic resin, the intended effects of the invention can be successfully achieved. The use of polymeric MDI is preferred because it has a larger number of isocyanate groups than monomeric MDI and thus provides a large scuff resistance-improving effect due to crosslink formation, and moreover because it is in a liquid state at normal temperatures and thus has an excellent handleability. However, polymeric MDI generally has a dark brown appearance, which may discolor and contaminate the cover material to be treated. Because such discoloration is pronounced when treatment is carried out with polymeric MDI in the form of a solution obtained by dissolution in an organic solvent, in the practice of the invention, owing to concern over such discoloration, the polymeric MDI is used in a state that is free of organic solvents. Alternatively, commercial products may be suitably used as the polymeric MDI. Illustrative examples include Sumidur p-MDI 44V20L, 44V10, 44V40 and SBU Isocyanate J243 from Sumika Bayer Urethane Co., Ltd.; MONDUR MR Light from Bayer Material Science; PAPI 27 from Dow Chemical Company; Millionate MR-100, MR-200 and MR-400 from Tosoh Corporation; and Lupranate M20S, M11S and M5S from BASF INOAC Polyurethane, Ltd.

In this invention, the preliminary treatments described in, for example, JP 4114198 and JP 4247735 may be suitably used as methods for reducing discoloration by polymeric MDI. Although the techniques described in these patent publications may be adopted for use here, the possibilities are not limited to these techniques alone. When such preliminary treatment is carried out and the treatment is followed by suitable washing, substantially no discoloration or contamination arises.

A dipping method, coating method (spraying method), infiltration method under heat and pressure application, dropwise addition method or the like may be suitably used as the method of treating the surface with the isocyanate compound. From the standpoint of process control and productivity, the use of a dipping method, coating method or dropwise addition method is especially preferred. The length of treatment by the dipping method is preferably from 1 to 180 minutes, more preferably from 10 to 120 minutes, and even more preferably from 20 to 90 minutes. When the treatment time is too short, a sufficient crosslinking effect is difficult to obtain. On the other hand, when the treatment time is too long, there is a possibility of substantial discoloration of the cover surface by excess isocyanate compound. Also, with a long treatment time, the production lead time becomes long, which is not very desirable from the standpoint of productivity. With regard to the temperature during such treatment, from the standpoint of productivity, it is preferable to control the temperature within a range that allows a stable molten liquid state to be maintained and also allows the reactivity to be stably maintained. The temperature is preferably from 10 to 80° C., more preferably from 15 to 70° C., and even more preferably from 20 to 60° C. When the treatment temperature is too low, infiltration and diffusion to the cover material or reactivity at the surface layer interface may be inadequate, as a result of which the desired properties may not be achieved. On the other hand, when the treatment temperature is too high, infiltration and diffusion to the cover material or reactivity at the surface layer interface may increase and there is a possibility of greater discoloration of the cover surface on account of excess isocyanate compound. Also, in cases where the ball appearance—including the shapes of the dimples—changes, or an ionomeric material is used in part of the golf ball, there is a possibility that this will give rise to changes in the physical properties of the ball. By carrying out treatment for a length of time and at a temperature in these preferred ranges, it is possible to obtain a sufficient crosslinking effect and, in turn, to achieve the desired ball properties without a loss of productivity.

To control the reactivity and obtain a golf ball having an even better scuff resistance and spin performance, a catalyst or a compound having two, three or more functional groups that react with isocyanate groups can be incorporated beforehand in the isocyanate compound treatment agent or in the cover material to be treated. The method of incorporating such a compound may involve mixing the compound, in a dispersed state, with a liquid melt of the isocyanate compound treatment agent; using a mixer such as a single-screw or twin-screw extruder to mix the compound into the thermoplastic resin that is the material to be treated (cover material); or charging the respective ingredients in a dry blended state into an injection molding machine. When the last of these methods is used, during charging, the compound may be charged alone, or may be rendered beforehand into a masterbatch state using a suitable base material.

Drying treatment may be carried out preliminary to surface treatment with the above isocyanate compound. That is, when treating the cover molded from a thermoplastic material that includes a polyurethane, a polyurea or a mixture thereof, to remove moisture contained in the cover material and thereby stabilize the physical properties following treatment and increase the life of the treatment solution, it may be desirable to carry out, as needed, drying treatment or the like beforehand, although this is not always the case. A common method such as warm-air drying or vacuum drying may be used as the drying treatment. Such treatment preliminary to surface treatment, particularly in the case of golf balls containing an ionomeric material in a portion thereof, is preferably carried out under conditions that do not cause deformation or changes in the physical properties. When warm air drying is carried in such preliminary treatment, although not particularly limited, it is desirable to set the temperature to from 15 to 60° C., and preferably from 20 to 55° C., and to set the time to preferably from 10 to 180 minutes, more preferably from 15 to 120 minutes, and even more preferably from 30 to 60 minutes. The drying conditions may be suitably selected according to the moisture content within the cover material and are typically adjusted so that the moisture content in the cover material becomes preferably 5,000 ppm or less, more preferably 3,500 ppm or less, even more preferably 2,500 ppm or less, and most preferably 1,000 ppm or less.

Step (2): Washing

Next, excess isocyanate compound is washed off and physically removed by blasting a specific substance at high pressure against the surface of the cover. This step removes excess isocyanate compound remaining on the outermost cover layer following surface treatment with isocyanate compound but does not completely remove from all areas of the outermost cover layer the isocyanate compound that has impregnated into and is present within this layer, thus allowing the advantageous effects of surface treatment with the isocyanate compound in the preceding step to be fully exhibited. That is, the scuff resistance of the ball can be increased and the spin rate on driver (W#1) shots is sufficiently reduced, making it possible to achieve a satisfactory distance.

In the washing step, the specific substance that is blasted at high pressure is not particularly limited. However, preferred use can be made of at least one type of substance selected from the group consisting of substances that are liquids at normal temperatures, such as water and alcohol; substances that are solids, such as sand, vitrified abrasives, plastic abrasives, alumina abrasives, organic abrasives and metal abrasives; normally gaseous substances such as air and substances such as dry ice which sublimate from a solid state to a gaseous state at normal temperatures; as well as mixtures thereof.

In this washing step, the discharge pressure when blasting the specific substance is set to a high pressure. Specifically, the discharge pressure is preferably at least 3 MPa, more preferably at least 6 MPa, and even more preferably at least 8 MPa.

The use of water or an alcohol as the specific substance to be blasted is preferred because the amount of isocyanate (NCO groups) which remains without being excessively removed increases, and it is possible to lower the temperature of surface treatment with isocyanate compound or to shorten the treatment time. Also, as will be explained later in the specification, whereas contact with water or alcohol is normally banned for isocyanate compounds, the significance of the invention resides in the intentional use of water or alcohol. When such water or alcohol is used, the discharge rate by a high-pressure washer is preferably at least 180 L/h, more preferably at least 300 L/h, and even more preferably at least 400 L/h.

In this washing step, the temperature when blasting the specific substance, although not particularly limited, is preferably at least 5° C., more preferably from 10° C. to 80° C., and even more preferably from 15° C. to 60° C. The washing time, although not particularly limited, is preferably at least 10 seconds, and more preferably from 15 to 30 seconds.

Exemplary high-pressure washers include commercial high-pressure washers such as those manufactured by, for example, Karcher, Ryobi, Iris Ohyama, Hidaka or Hitachi.

In this invention, employing this washing step has the following actions and desirable effects.

(i) When washing with an organic solvent that dissolves the isocyanate compound and has no reactive groups capable of reacting with the isocyanate compound, there is a possibility that the solvent will cause the polyurethane in the outermost cover layer to swell, and there is also a possibility that even isocyanate compound that has impregnated to the interior will be removed. Water and alcohols have reactive groups that react with isocyanate, leading to reaction and solidification, which is why contact with water and alcohol was strictly banned.

However, in this invention, because the isocyanate compound is not excessively removed, the scuff resistance can be improved, in addition to which the spin rate on shots with a driver (W#1) can be adequately reduced.

(ii) The above washing step does not require, for example, numerous operations or a large amount of material, and thus can be carried out relatively inexpensively, resulting in economical reductions in costs such as material costs and equipment costs.

(iii) Rather than using organic solvents which cause the polyurethane to swell, dissolve the isocyanate compound and have no reactive groups capable of reacting with the isocyanate compound, the above washing step uses water or a relatively safe alcohol, and thus is friendly to the environment.

(iv) Isocyanate compounds readily react with water or alcohol and solidify and at the same time generate carbon dioxide, and so contact with water and alcohols is generally banned. However, in the inventive manufacturing method, with high-pressure washing, the isocyanate compound becomes finely dispersed within a large amount of washing solution, allowing it to be relatively safely used. Moreover, because water and alcohols render the isocyanate compound into a solidified state within the wash solution after washing, this solid matter can be easily removed, enabling the wash solution to be reused.

(v) When washing is carried out with an organic solvent that causes the polyurethane to swell after surface treatment, dissolves the isocyanate compound and has no reactive groups capable of reacting with the isocyanate compound, one problem has been the swelling of pin marks that are formed by the plurality of support pins used in injection molding and remain on the molded ball. Because the washing step in this invention does not involve washing with an organic solvent that causes the polyurethane to swell after surface treatment, dissolves the isocyanate compound and has no reactive groups capable of reacting with the isocyanate compound, pin marks due to support pins do not remain on the molded ball, enabling a good ball appearance to be maintained.

Following surface treatment with the isocyanate compound, it is preferable to provide a suitable curing step in order to have the crosslinking reactions between the polyurethane or polyurea thermoplastic material and the isocyanate compound effectively proceed, thereby enhancing and stabilizing the physical properties and quality, and also to control and shorten the production takt time. However, because reaction of the isocyanate proceeds even at room temperature, it is not always necessary to provide a curing step. In cases where a curing step is provided, a method that causes the crosslinking reactions to proceed under the effect of heat or pressure and in the presence of a catalyst may be suitably selected. Specifically, it is preferable to carry out heating treatment under suitable temperature and time conditions that are typically from 15 to 150° C. for up to 24 hours, preferably from 20 to 100° C. for up to 12 hours, and more preferably from 30 to 70° C. for up to 6 hours.

The degree to which, following surface treatment with the isocyanate compound, crosslinking reactions between the polyurethane or polyurea thermoplastic material and the isocyanate compound have proceeded can be determined by a suitable technique. For example, it is effective to use attenuated total reflectance (ATR) Fourier transform infrared absorption spectroscopy (FT-IR) to measure the ball surface after curing.

Specifically, when an infrared absorption spectrum measured by FT-IR/ATR spectroscopy at an outside portion of the outermost cover layer of the golf ball manufactured by steps (1) and (2) is plotted as absorbance versus wave number, letting the absorbance peak heights near the wave numbers 1512 cm$^{-1}$, 2280 cm$^{-1}$ and 2840 cm$^{-1}$ be respectively $P_1$, $Q_1$ and $R_1$, the value $Q_1/R_1$ is preferably larger than $P_1$. The absorbance peak height $P_1$ near the wave number 1512 cm$^{-1}$ is the absorbance peak height for bending vibrations by the amide groups (NHCO groups) in urethane bonds. The absorbance peak height near the wave number 2280 cm$^{-1}$ represents the peak intensity from isocyanate groups (NCO groups), and the absorbance peak height near the wave number 2840 cm$^{-1}$ represents the peak intensity from CH stretching vibrations. Hence, the foregoing relationship indicates that the peak intensity from isocyanate groups (NCO groups) is somewhat high. Compared to washing with an organic solvent such as acetone, the washing method used in this invention leaves many isocyanate groups (NCO groups) within the outermost cover layer, enabling ball attributes such as scuff resistance and spin properties to be improved.

Here, FIG. 1 shows the infrared absorption spectrum measured by FT-IR/ATR spectroscopy and represented as a plot of absorbance versus wave number, and FIG. 2 is an enlarged view of part of the spectrum shown in FIG. 1. As shown in FIG. 2, baseline correction is carried out so as to set the absorbances at wave numbers of 1494 cm$^{-1}$ and 1571 cm$^{-1}$ m: to 0, and $P_1$ is determined as the absorbance peak height following correction. The absorbance peak height is computed relative to a baseline in order to correct for the variability in the measured values for absorbance that arises with each measurement. To increase the accuracy of the measured data, the absorbance peak height is determined by increasing the number of measurements (N) so as to have the relative standard deviation (%) (also referred to below as "RSD") be 3.0% or less. The relative standard deviation (%) is expressed by the following formula.

Relative standard deviation (%)=(standard deviation/average value)×100

The value $Q_1/R_1$ is preferably at least 0.3, and more preferably at least 0.4. Outside of this range, the scuff resistance is inferior and a good, low spin rate on shots with a driver (W#1) may not be obtained.

FT-IR analysis at the outside portion of the outermost cover layer entails measurement by the ATR method or by the ATR method with IR microscopy after preparation of an unpainted ball, or, when a painted ball is to be used, after removing the paint, so that the sample surface is sufficiently smooth. As used herein, "outside portion of the outermost layer" refers to a portion that includes not only a surface of the outermost layer, but also extends up to a region 100 μm from this surface and toward the core center. In carrying out measurement, the number of measurements (N) is increased until the relative standard deviation of the measurement data becomes 3.0% or less. Because it takes several days for progress of the crosslinking reactions to stabilize, it is preferable to measure the samples when about one week has elapsed following treatment. FT-IR/ATR spectroscopy may be carried out in accordance with the method described in JIS K 0117.

The method of molding the outermost layer of the cover is exemplified by a method that feeds the resin composition to an injection molding machine and injects the molten resin composition over the core, thereby molding the outermost layer of the cover. In such cases, the molding temperature varies according to such factors as the type of thermoplastic polyurethane, but is generally in the range of 150 to 270° C.

In the cover of one or more layer forming a part of the inventive golf ball, the ball surface hardness following the above-described surface treatment, expressed in terms of Durometer D hardness, is preferably from 30 to 70, and more preferably from 33 to 65. When the hardness of the outermost cover layer is too low, the spin rate of the ball on shots with a driver may rise, resulting in a decreased distance. On the other hand, when the hardness of the cover outermost layer is too high, the feel at impact may worsen and the resulting rebound and durability performance may be inferior to those of the urethane material itself.

The rebound resilience of the outermost layer prior to the above surface treatment, although not particularly limited, is preferably at least 35%, more preferably at least 40%, and even more preferably at least 45%. If the rebound resilience of the cover outermost layer is too low, the distance traveled by the golf ball may greatly decrease. On the other hand, if the rebound resilience of the outermost layer of the cover is too high, the initial velocity on shots of up to 100 yards that require control and on putts becomes too high and may not feel right to the golfer. As used herein, "rebound resilience" refers to the rebound resilience measured in accordance with JIS K7311.

The core used in the golf ball of the invention is not particularly limited. Use may be made of various types of cores, such as, for example, a solid core for a two-piece ball, a solid core having a plurality of vulcanized rubber layers, a solid core having a plurality of resin layers, or a wound core having a layer of rubber thread. No limitations are imposed on the diameter, weight, hardness, constituent materials and other characteristics of the core.

In the golf ball of the invention, when the cover has two or more layers—that is, when the cover has a construction which includes an intermediate layer to the inside of the outermost layer, no particular limitations are imposed on the hardness, material, thickness and other characteristics of the intermediate layer. To improve adherence between the intermediate layer and the outermost layer, where necessary, a primer layer may be provided or a common known technique for improving adherence or adhesion may be employed. Examples of common known techniques include plasma surface treatment (e.g., microwave plasma treatment, high-frequency plasma treatment, atmospheric pressure plasma treatment), corona discharge treatment, flame treatment, treatment by exposure to ultraviolet irradiation, chlorine treatment, treatment by wiping the surface with an organic solvent, silane coupling agent coating treatment, honing treatment, chemical etching treatment and physical surface roughening treatment. These types of treatment may be used singly or as combinations of two or more thereof.

The thickness of the outermost layer of the cover may be set in the range of 0.1 to 5.0 mm, preferably 0.3 to 3.0 mm, and more preferably 0.5 to 2.0 mm. In cases where the cover is formed so as to have a multilayer structure of two or more layers, the thickness of the intermediate layer, although not particularly limited, may be set in the range of 0.1 to 5.0 mm, preferably 0.3 to 3.0 mm, and more preferably 0.5 to 2.0 mm.

The golf ball of the invention is preferably formed to a diameter and weight in accordance with the Rules of Golf.

EXAMPLES

Working Examples of the invention and Comparative Examples are given below by way of illustration, although the invention is not limited by the following Examples.

Examples 1 to 12, Comparative Examples 1 to 6

Cores having a diameter of 36.3 mm were produced by using the formulation shown in Table 1 to prepare a core-forming rubber composition common to all the Examples, then curing and molding at 155° C. for 15 minutes. Next, cover layers (these being, in order from the inside: an envelope layer and an intermediate layer) formulated of the resin materials shown in the same table and common to all the Examples were successively injection-molded over the core, thereby giving an intermediate sphere. The envelope layer had a thickness of 1.3 mm and a material hardness, expressed in terms of Shore D hardness, of 51. The intermediate layer had a thickness of 1.1 mm and a material hardness, expressed in terms of Shore D hardness, of 62.

The outermost cover layer, which is common to all the Examples, was injection-molded over the intermediate sphere so as to encase the sphere. The resin materials used to form the outermost layer are shown in Table 2. The outermost layer had a thickness of 0.8 mm. Although not shown in the accompanying diagrams, numerous dimples were formed on the outside surface of the outermost layer at the same time as injection molding.

TABLE 1

| Ball component | | Formulated ingredients | Amounts |
|---|---|---|---|
| Cover | Intermediate layer | Himilan 1605 | 50 |
| | | Himilan 1557 | 15 |
| | | Himilan 1706 | 35 |
| | | Trimethylolpropane | 1.1 |
| | Envelope layer | HPF1000 | 100 |
| Core | | Polybutadiene A | 80 |
| | | Polybutadiene B | 20 |
| | | Organic peroxide | 1 |
| | | Barium sulfate | 21.5 |
| | | Zinc oxide | 4 |
| | | Zinc acrylate | 29.5 |
| | | Antioxidant | 0.1 |
| | | Zinc salt of pentachlorothiophenol | 0.3 |

Details on these core materials are given below. Numbers in the table indicate parts by weight.
Polybutadiene A: Available from JSR Corporation under the trade name "BR 01"
Polybutadiene B: Available from JSR Corporation under the trade name "BR 51"

Organic Peroxide: Dicumyl peroxide, available under the trade name "Percumyl D" (NOF Corporation)
Barium sulfate: Available from Sakai Chemical Co., Ltd. as "Precipitated Barium Sulfate 100"
Zinc oxide: Available from Sakai Chemical Co., Ltd.
Zinc acrylate: Available from Nihon Joryu Kogyo Co., Ltd.
Antioxidant: 2,2'-Methylenebis(4-methyl-6-butylphenol), available under the trade name "Nocrac NS-6" (Ouchi Shinko Chemical Industry Co., Ltd.)

Details on the cover (envelope layer, intermediate layer) materials are given below. Numbers in the table indicate parts by weight.

HPF 1000: An ionomer from E.I. DuPont de Nemours & Co.
Himilan 1605: A sodium ionomer from DuPont-Mitsui Polychemicals Co., Ltd.
Himilan 1557: A zinc ionomer from DuPont-Mitsui Polychemicals Co., Ltd.
Himilan 1706: A zinc ionomer from DuPont-Mitsui Polychemicals Co., Ltd.

TABLE 2

| Resin formulation (pbw) | II |
|---|---|
| Pandex T8290 | 50 |
| Pandex T8295 | 50 |
| Hytrel 4001 | 12 |
| Titanium oxide | 3.5 |
| Ultramarine | 0.4 |
| Polyethylene wax | 1 |
| Montan wax | 0.4 |

Details on the cover (outermost layer) materials are given below. Numbers in the table indicate parts by weight.
T-8290, T-8295: Ether-type thermoplastic polyurethanes available under the trademark Pandex from DIC Bayer Polymer
Hytrel 4001: A polyester elastomer available from DuPont-Toray Co., Ltd.
Polyethylene wax: Available under the trade name "Sanwax 161P" from Sanyo Chemical Industries, Ltd.
Titanium oxide: Tipaque R680, available from Ishihara Sangyo Kaisha, Ltd.

Immersion Treatment

Next, in each of the Working Examples and Comparative Examples, surface treatment was carried out at the surface of the outermost layer using polymeric MDI available under the trade name "Sumidur p-MDI 44V20L" from Sumika Bayer Urethane Co., Ltd. This surface treatment involved successively carrying out the following steps: (i) 60 minutes of preliminary warming at 55° C., and (ii) dipping treatment in which the entire ball was thoroughly immersed in isocyanate compound alone without using a solvent, under the temperature and time conditions shown in Tables 3, 4 and 5.

Washing Treatment

Next, a step was carried out that consisted of washing off and physically removing excess isocyanate compound by blasting the surface of the outermost layer in each Example at high pressure with the specific substances (washing solutions) shown in Tables 3 and 4. The conditions of the washing step in the respective Examples—namely, the washing solution, washing method, discharge pressure, discharge rate, washing solution temperature and washing time—are shown in Tables 3 and 4. A Karcher HD 4/8C pressure washer was used as the high-pressure washer in the Examples. The washing step was carried out by placing the golf balls that had been immersion treated with isocyanate compound in a basket made of metal mesh, setting up the high-pressure washer at a distance of about 20 cm from the balls, and washing the balls while rotating the basket at a speed of 20 rpm. In the Comparative Examples, washing was carried out by dipping the surface of the outermost cover layer in the organic solvents shown in Table 5 for 30 seconds at 15° C.

Curing Step

Following the above washing treatment, 60 minutes of curing was carried out at 55° C.

Golf balls on which the above surface treatment, washing treatment and curing step had been carried out were tested and evaluated by the methods described below. The results are shown in Tables 3, 4 and 5.

FTR Absorbance at Outside Portion of Outermost Layer

Samples were prepared by peeling the outermost cover layer from the intermediate layer. In order for the place of measurement on the cover surface to be in sufficiently close contact with the FT-IR measurement surface, measurement was carried out after pressing the center portion of a dimple from the back side of the cover so as to bring it into close contact with the measurement surface. When the infrared absorption spectrum measured by FT-IR/ATR spectroscopy at an outside portion of the outermost cover layer was plotted as absorbance versus wave number, the absorbance peak heights near the wave numbers 1512 cm$^{-1}$, 2280 cm$^{-1}$ and 2840 cm$^{-1}$ were designated as, respectively, $P_1$, $Q_1$ and $R_1$. To increase the accuracy of the measurement data, each absorbance peak height was determined by carrying out measurement N times so that the relative standard deviation (%) (referred to below as "RSD %") becomes 3.0% or less. Measurement was carried out seven days after surface treating the outermost layer. The instrument used for FT-IR/ATR measurement was the "Spectrum 100, System B" Fourier-transform infrared spectrophotometer (from Perkin Elmer). Samples were measured under the following conditions.

Measurement method: Attenuated total reflection (ATR)
Detector: FR-DIGS
Resolution: 4 cm$^{-1}$
Cumulative number: 16 times
Measurement wave number range: 4000 cm$^{-1}$ to 650 cm$^{-1}$
Place of measurement:
[Outside portion] Surface portion of dimple center Scuff Resistance The balls were held isothermally at 23° C. and five balls of each type were hit at a head speed of 33 m/s using as the club a pitching wedge mounted on a swing robot machine. The damage to the ball from the impact was visually evaluated based on the following 5-point scale, and the average score for each type of ball was calculated.
 5: No damage or substantially no damage.
 4: Damage is apparent but so slight as to be of substantially no concern.
 3: Surface is slightly frayed.
 2: Some fraying of surface or loss of dimples.
 1: Dimples completely obliterated in places.

Flight Performance

A driver (W#1) was mounted on a golf swing robot, and the spin rate and total distance when the ball was struck at a head speed of 45 m/s were measured. The club used was a TourStage X-Drive 707 (2012 model; loft angle, 9.5°) manufactured by Bridgestone Sports Co., Ltd.

Appearance (Completeness of Washing)

The appearance (surface) of the ball after washing was examined for remaining stains due to incomplete washing, and rated according to the following criteria. Stains that remain on the surface of the ball may detract from the ball appearance, worsen the weather resistance of the ball, and also give rise to undesirable effects such as peeling of the paint film when the ball is struck.

Good: No remaining stains due to incomplete washing.
Fair: Slight amount of remaining stains due to incomplete washing.
NG: Substantial amount of remaining stains due to incomplete washing.

Evaluation of Pin Marks (NG Ratio)

Pin marks on the ball surface were graded by the following method. The pin areas of the ball surface were rubbed with a black oil-based colored pencil and then wiped with a dry cloth. After wiping, the number of pin marks where the black pencil remained in the pin areas was counted. Letting this number be "NG," the NG ratio (%) with respect to the total number of pins present on a single ball was calculated.

TABLE 3

| | | | Example | | | | | |
|---|---|---|---|---|---|---|---|---|
| | | | 1 | 2 | 3 | 4 | 5 | 6 |
| Immersion treatment | Treatment temperature (° C.) | | 53 | 53 | 53 | 53 | 53 | 53 |
| | Treatment time (min) | | 40 | 40 | 40 | 40 | 30 | 30 |
| Washing treatment | Washing solution | | high-pressure water | high-pressure water | high-pressure water | high-pressure water | high-pressure water | high-pressure water |
| | Washing method | | high-pressure blasting | high-pressure blasting | high-pressure blasting | high-pressure blasting | high-pressure blasting | high-pressure blasting |
| | Discharge pressure (MPa) | | 8 | 3 | 8 | 8 | 8 | 8 |
| | Discharge rate (L/h) | | 400 | 180 | 400 | 400 | 400 | 400 |
| | Temperature of washing solution (° C.) | | 15 | 15 | 15 | 15 | 5 | 10 |
| | Washing time (sec) | | 10 | 30 | 20 | 30 | 30 | 30 |
| Outermost layer | FT-IR analysis | P1 | 0.241 | 0.237 | 0.238 | 0.236 | 0.237 | 0.238 |
| | | Q1 | 0.082 | 0.084 | 0.077 | 0.070 | 0.081 | 0.078 |
| | | R1 | 0.153 | 0.151 | 0.149 | 0.142 | 0.150 | 0.148 |
| | | Q1/R1 | 0.536 | 0.556 | 0.517 | 0.494 | 0.540 | 0.527 |
| | | (Q1/R1) > P1 | good | good | good | good | good | good |
| | | Q1/R1 ≥ 0.3 | good | good | good | good | good | good |
| | | Q1/R1 ≥ 0.4 | good | good | good | good | good | good |
| Ball performance | Diameter (mm) | | 42.72 | 42.73 | 42.70 | 42.68 | 42.69 | 42.67 |
| | Weight (g) | | 45.50 | 45.52 | 45.45 | 45.43 | 45.45 | 45.47 |
| | Scuff resistance (23° C. average) | | 4.9 | 4.9 | 4.7 | 4.5 | 4.8 | 4.7 |
| | Spin rate on shots with driver | rpm | 2,952 | 2,950 | 2,960 | 2,964 | 2,950 | 2,965 |
| | | Difference with Comparative Example 1 (rpm) | −155 | −157 | −147 | −143 | −157 | −142 |
| | Total distance (m) | | 229 | 229 | 229 | 229 | 229 | 230 |
| | Appearance (completeness of washing) | Rating | fair | fair | good | good | fair | good |
| | Pin mark NG ratio (%) | | 0 | 0 | 0 | 0 | 0 | 0 |

TABLE 4

| | | | Example | | | | | |
|---|---|---|---|---|---|---|---|---|
| | | | 7 | 8 | 9 | 10 | 11 | 12 |
| Immersion treatment | Treatment temperature (° C.) | | 53 | 53 | 53 | 53 | 53 | 53 |
| | Treatment time (min) | | 30 | 30 | 30 | 30 | 30 | 30 |
| Washing treatment | Washing solution | | high-pressure water | high-pressure water | high-pressure water | high-pressure water | high-pressure water | high-pressure water |
| | Washing method | | high-pressure blasting | high-pressure blasting | high-pressure blasting | high-pressure blasting | high-pressure blasting | high-pressure blasting |
| | Discharge pressure (MPa) | | 8 | 8 | 8 | 8 | 8 | 8 |
| | Discharge rate (L/h) | | 400 | 400 | 400 | 400 | 400 | 400 |
| | Temperature of washing solution (° C.) | | 15 | 30 | 60 | 60 | 60 | 60 |
| | Washing time (sec) | | 30 | 20 | 10 | 15 | 20 | 30 |
| Outermost layer | FT-IR analysis | P1 | 0.234 | 0.234 | 0.237 | 0.234 | 0.239 | 0.241 |
| | | Q1 | 0.069 | 0.070 | 0.081 | 0.076 | 0.062 | 0.056 |
| | | R1 | 0.140 | 0.141 | 0.151 | 0.148 | 0.152 | 0.149 |
| | | Q1/R1 | 0.493 | 0.496 | 0.536 | 0.514 | 0.408 | 0.376 |
| | | (Q1/R1) > P1 | good | good | good | good | good | good |
| | | Q1/R1 ≥ 0.3 | good | good | good | good | good | good |
| | | Q1/R1 ≥ 0.4 | good | good | good | good | good | NG |

TABLE 4-continued

|  |  | Example | | | | | |
|---|---|---|---|---|---|---|---|
|  |  | 7 | 8 | 9 | 10 | 11 | 12 |
| Ball performance | Diameter (mm) | 42.66 | 42.69 | 42.71 | 42.69 | 42.67 | 42.65 |
|  | Weight (g) | 45.41 | 45.42 | 45.49 | 45.48 | 45.46 | 45.44 |
|  | Scuff resistance (23° C. average) | 4.5 | 4.5 | 4.8 | 4.6 | 4.4 | 4.3 |
|  | Spin rate on shots with driver — rpm | 2,979 | 2,970 | 2,963 | 2,968 | 2,979 | 2,998 |
|  | Spin rate on shots with driver — Difference with Comparative Example 1 (rpm) | −128 | −137 | −144 | −139 | −128 | −109 |
|  | Total distance (m) | 229 | 230 | 230 | 228 | 229 | 229 |
|  | Appearance Rating (completeness of washing) | good | good | fair | good | good | good |
|  | Pin mark NG ratio (%) | 0 | 0 | 0 | 0 | 0 | 0 |

TABLE 5

|  |  |  | Comparative Example | | | | | |
|---|---|---|---|---|---|---|---|---|
|  |  |  | 1 | 2 | 3 | 4 | 5 | 6 |
| Immersion treatment | Treatment temperature (° C.) | | 53 | 53 | 53 | 53 | 53 | 53 |
|  | Treatment time (min) | | 40 | 40 | 40 | 40 | 40 | 40 |
| Washing treatment | Washing solution | | acetone | ethyl acetate | toluene | cyclo-hexanone | MEK | MIBK |
|  | Washing method | | dipping | dipping | dipping | dipping | dipping | dipping |
|  | Discharge pressure (MPa) | | — | — | — | — | — | — |
|  | Discharge rate (L/h) | | — | — | — | — | — | — |
|  | Temperature of washing solution (° C.) | | 15 | 15 | 15 | 15 | 15 | 15 |
|  | Washing time (sec) | | 30 | 30 | 30 | 30 | 30 | 30 |
| Outermost layer | FT-IR analysis | P1 | 0.194 | 0.199 | 0.198 | 0.202 | 0.199 | 0.206 |
|  |  | Q1 | 0.011 | 0.030 | 0.031 | 0.015 | 0.013 | 0.019 |
|  |  | R1 | 0.164 | 0.159 | 0.158 | 0.161 | 0.162 | 0.163 |
|  |  | Q1/R1 | 0.064 | 0.189 | 0.196 | 0.093 | 0.080 | 0.117 |
|  |  | (Q1/R1) > P1 | NG | NG | NG | NG | NG | NG |
|  |  | Q1/R1 ≥ 0.3 | NG | NG | NG | NG | NG | NG |
|  |  | Q1/R1 ≥ 0.4 | NG | NG | NG | NG | NG | NG |
| Ball performance | Diameter (mm) | | 42.68 | 42.70 | 42.69 | 42.67 | 42.68 | 42.71 |
|  | Weight (g) | | 45.43 | 45.43 | 45.42 | 45.48 | 45.44 | 45.52 |
|  | Scuff resistance (23° C. average) | | 3.9 | 4.0 | 4.0 | 3.9 | 4.0 | 4.0 |
|  | Spin rate on shots with driver — rpm | | 3,107 | 3,046 | 3,063 | 3,085 | 3,073 | 3,062 |
|  | Spin rate on shots with driver — Difference with Comparative Example 1 (rpm) | | — | −61 | −44 | −22 | −34 | −45 |
|  | Total distance (m) | | 228 | 229 | 230 | 228 | 229 | 229 |
|  | Appearance Rating (completeness of washing) | | good | fair | good | good | good | fair |
|  | Pin mark NG ratio (%) | | 81 | 92 | 87 | 83 | 81 | 83 |

\* In the table, "MEK" stands for methyl ethyl ketone, and "MIBK" stands for methyl isobutyl ketone.

The ball performance results in Tables 3 to 5 are discussed below.

Examples 1, 3 and 4 had better scuff resistances than Comparative Examples 1 to 6, achieved satisfactory total distances on shots with a driver (W#1) owing to a reduced spin rate, and had an appearance unblemished by pin marks.

Example 2 had a lower discharge pressure and discharge rate than in Example 4, a higher scuff resistance and a larger spin rate-lowering effect. Relative to Comparative Examples 1 to 6, the scuff resistance was excellent, a spin rate-lowering effect on shots with a driver (W#1) was obtained, resulting in a satisfactory total distance, and the ball had an appearance unblemished by pin marks.

Although Example 7 had a shorter treatment time than in Example 4, relative to Comparative Examples 1 to 6, the scuff resistance was excellent, a spin rate-lowering effect on shots with a driver (W#1) was obtained, resulting in a satisfactory total distance, and the ball had an appearance unblemished by pin marks.

Examples 5 and 6 had a lower washing solution temperature than in Example 7, a higher scuff resistance and a larger spin rate-lowering effect. Also, relative to Comparative Examples 1 to 6, the scuff resistance was excellent, a spin rate-lowering effect on shots with a driver (W#1) was obtained, resulting in a satisfactory total distance, and the ball had an appearance unblemished by pin marks.

Examples 8, 10 and 11 had a higher washing solution temperature and a shorter washing time than in Example 7, yet achieved a comparable performance. Relative to Comparative Examples 1 to 6, the scuff resistance was excellent, a spin rate-lowering effect on shots with a driver (W#1) was obtained, resulting in a satisfactory total distance, and the ball had an appearance unblemished by pin marks.

Example 9 had an even shorter washing time, and a better scuff resistance and spin rate-lowering effect, than in Examples 10 and 11. Also, relative to Comparative Examples 1 to 6, the scuff resistance was excellent, a spin rate-lowering effect on shots with a driver (W#1) was obtained, resulting in a satisfactory total distance, and the ball had an appearance unblemished by pin marks.

Example 12 had a longer wash time than in Examples 9 to 11 and a scuff resistance and spin-rate lowering effect that were somewhat inferior. However, relative to Comparative Examples 1 to 6, the scuff resistance was excellent, a spin rate-lowering effect on shots with a driver (W#1) was obtained, resulting in a satisfactory total distance, and the ball had an appearance unblemished by pin marks.

The invention claimed is:

1. A method of manufacturing a golf ball having a core and a cover of one or more layer over the core, wherein an outermost layer of the cover is molded of a thermoplastic material selected from the group consisting of polyurethane, polyurea and mixtures thereof, the method comprising at least the following steps (1) and (2):
   (1) treating a surface of the cover with an isocyanate compound; and
   (2) washing off and physically removing excess isocyanate compound by using a specific substance, and wherein, when an infrared absorption spectrum measured by FT-IR/ATR spectroscopy at an outside portion of the outermost cover layer of the golf ball manufactured by steps (1) and (2) is plotted as absorbance versus wave number, letting the absorbance peak heights near the wave numbers 1512 cm$^{-1}$, 2280 cm$^{-1}$ and 2840 cm$^{-1}$ be respectively $P_1$, $Q_1$ and $R_1$, the value $Q_1/R_1$ is larger than $P_1$,
   wherein in step (2), the specific substance is used by blasting the cover surface with the specific substance at a temperature of at least 5° C.

2. The golf ball manufacturing method of claim 1 wherein, in step (2), the specific substance is at least one selected from the group consisting of water, alcohol, dry ice, air, sand, vitrified abrasives, plastic abrasives, alumina abrasives, organic abrasives, metal abrasives, and mixtures thereof.

3. The golf ball manufacturing method of claim 1 wherein, in step (2), blasting with the specific substance is carried out at a discharge pressure of at least 3 MPa.

4. The golf ball manufacturing method of claim 1 wherein, in step (2), washing is carried out for a washing time of at least 10 seconds.

5. The golf ball manufacturing method of claim 1, wherein the value $Q_1/R_1$ is at least 0.3.

6. The golf ball manufacturing method of claim 1, wherein the value $Q_1/R_1$ is at least 0.4.

7. The golf ball manufacturing method of claim 1, wherein the isocyanate compound is one or a mixture of two or more selected from the group consisting of tolylene-2,6-diisocyanate, tolyene-2,4-diisocyanate, 4,4'-diphenylmethanediisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives thereof, and prepolymers formed of said isocyanate compounds.

8. The golf ball manufacturing method of claim 1 wherein, in step (1), the isocyanate compound is polymethylene polyphenyl polyisocyanate (polymeric MDI).

9. The golf ball manufacturing method of claim 1 wherein, in step (2), the isocyanate compound becomes finely dispersed within a wash solution comprising the specific substance, thereby enabling a resulting composition comprising the wash solution and the isocyanate compound to be reused.

10. The golf ball manufacturing method of claim 9, wherein the isocyanate compound in the resulting composition is able to be reused.

11. The golf ball manufacturing method of claim 9, wherein the specific substance in the resulting composition is able to be reused.

12. The golf ball manufacturing method of claim 1 wherein, in step (2), the specific substance renders the isocyanate compound into a solidified state within a wash solution comprising the specific substance after washing, and then the solidified isocyanate compound is removed from the wash solution, thereby enabling the wash solution to be reused.

* * * * *